(12) United States Patent
Sperber

(10) Patent No.: US 6,231,961 B1
(45) Date of Patent: May 15, 2001

(54) LAYERED STRUCTURES COMPRISING PARTICLES, A DRY BINDER AND A FOAMABLE SUBSTANCE

(76) Inventor: Henry Sperber, 8 Red Fox La., Englewood, CO (US) 80111

( * ) Notice: Subject to any disclaimer, the term of this patent is extended or adjusted under 35 U.S.C. 154(b) by 0 days.

(21) Appl. No.: 09/207,706

(22) Filed: Dec. 9, 1998

(51) Int. Cl.[7] .................... B32B 7/12; B32B 5/22
(52) U.S. Cl. .................... 428/317.1; 428/304.4; 428/308.4; 428/309.9; 428/311.1; 428/314.4; 428/315.9; 428/317.5; 428/317.7; 428/317.9; 428/320.2; 428/322.7; 428/325; 428/326
(58) Field of Search .................. 428/304.4, 308.4, 428/309.9, 311.1, 314.4, 315.9, 317.1, 317.5, 317.7, 317.9, 320.2, 322.7, 325, 326

(56) References Cited

U.S. PATENT DOCUMENTS

| | | | |
|---|---|---|---|
| 4,402,892 | * 9/1983 | Helser | 264/42 |
| 4,768,710 | 9/1988 | Sperber | 239/8 |
| 5,131,590 | 7/1992 | Sperber | 239/8 |
| 5,272,852 | 12/1993 | Fortin et al. | 52/743 |
| 5,393,794 | * 2/1995 | Sperber | 521/78 |
| 5,421,922 | * 6/1995 | Sperber | 156/71 |
| 5,587,231 | * 12/1996 | Mereer et al. | 428/283 |
| 5,641,368 | 6/1997 | Romes et al. | 156/71 |
| 5,647,696 | 7/1997 | Sperber | 40/56 |
| 5,666,780 | 9/1997 | Romes et al. | 52/743.13 |

OTHER PUBLICATIONS

*Fiberiffic Energy System,* a division of Abiff MFG. Corp., The Most Advanced Insulation System in the World, Entire Brochure, 1995.

* cited by examiner

*Primary Examiner*—Yogendra Gupta
*Assistant Examiner*—Charles Boyer
(74) *Attorney, Agent, or Firm*—Sheridan Ross PC

(57) ABSTRACT

A layered structure that includes a product mixture of numerous particles, a foamable substance, such as including a liquid binder, and a reacted dry binder is provided. The particles preferably are comprised of cellulosic, fibrous materials. The dry binder reacts with the liquid binder to create a strong bond among separated particles. The particles are separated during transport, together with the dry binder, before the dry binder is reacted with the foamed liquid binder. Upon contact with the liquid binder, the dry binder reacts to cause desired adhesion among the separated particles. The reacted dry binder is disposed relatively inwardly of the product mixture, while the liquid binder is located outwardly thereof, with at least some of the liquid binder, after curing, being disposed on outer portions of the product mixture. The layered structure also includes one or more outer members or panels that are laminated or otherwise joined to the outer surface portions of the product mixture. Packaging materials can be made from such a layered structure. Additionally, wall units, panels, dividers and other enclosures or supporting units can be configured from one or more of such layered structures.

19 Claims, 2 Drawing Sheets

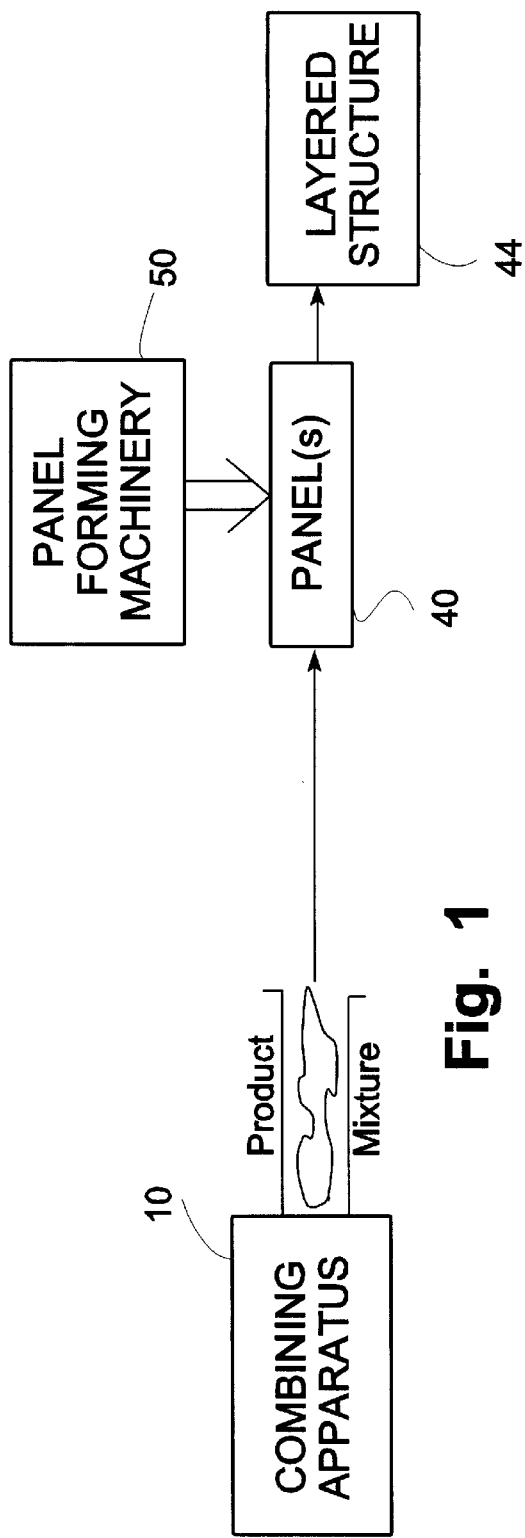
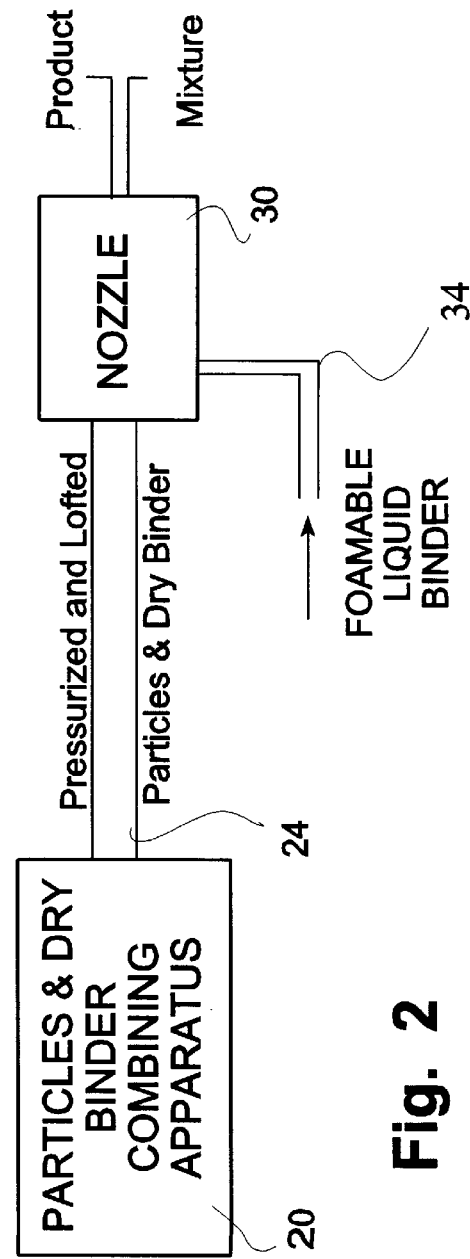

LAYERED STRUCTURES COMPRISING PARTICLES, A DRY BINDER AND A FOAMABLE SUBSTANCE

FIELD OF THE INVENTION

The present invention relates to forming a product mixture from a foamable substance (e.g. a liquid binder), a dry binder and a number of particles and, particularly, where the product mixture is joined to one or more relatively rigid outer members.

BACKGROUND OF THE INVENTION

Packaging products are produced in many forms and sizes. Such packaging products are used to contain and support the contents thereof. Packing materials may be included within or may be part of the packaging products. Such packing materials can cushion, absorb or otherwise safeguard the contents against pressures or forces that the packaging product might be subject to during handing or use. A common packaging product is made from cardboard. On many occasions, it is necessary to provide additional packing materials in the cardboard box or construction to safeguard the contents of the box against forces that experiences as it is shipped. Often times it is not feasible to recycle or re-use these additional materials provided in such cardboard boxes because of their compositions.

It would be desirable to provide a packaging structure from materials that are not environmentally detrimental or burdensome, while keeping the packaging lightweight and of sufficient strength to support the contents. Such a packaging product should be readily and cost competitively fabricated and formed. Cardboard packaging is essentially a layered unit that has been suitably configured or folded to a desired size and shape. In view of this packaging construction, other applications can be identified for a layered structure that is lightweight and relatively strong. These applications might include doors, room dividers, panels generally and other enclosures or supports.

SUMMARY OF THE INVENTION

A layered structure is provided for a number of applications including packaging, such as cardboard packages or boxes. The layered structure includes a sub-combination of a product mixture that is combined with one or more outer members or layers. The product mixture includes a number of particles. These particles may be organic, fibrous particles such as made from paper or other cellulosic materials, although other particle components can be employed so long as they are relatively low density and have suitable strength. The mixture also includes a dry binder material or adhesive and a foamable substance, such as a liquid binder material or adhesive that may have a foaming agent. The dry binder must properly react with the liquid binder when they come in contact to produce a sufficiently strong adhesion or binding among the numerous particles, particularly after the product mixture cures or has dried. The dry binder preferably has greater adhesion characteristics or properties than does the liquid binder or other foamable substance. The dry binder is preferably added to the particles before being contacted by the liquid binder. Such contact also occurs after the combination of dry binder and particles are lofted or spread apart using a suitable force or pressure, such as supplied by pressurized air that carries the combination of the dry binder and particles along a hose. The liquid binder is provided or formed into a foamed adhesive. This can be accomplished, for example, by means of a foaming agent that is part of the liquid binder. The foaming occurs when the liquid adhesive is subject to a force or agitation such as that induced by pressurized air or some mechanical device or other machinery that causes the liquid adhesive to properly foam. In another embodiment, the foamable substance is primarily water. In the preferred embodiment, the foamed liquid binder that includes air pockets or air bubbles contacts the spread apart particles with dry binder before being output from the apparatus that is used in combining these materials. In so doing, the foamed liquid binder not only acts to maintain the separation among the particles to provide a lower density product but also reacts with the dry binder so that the reacted dry binder provides greater or stronger adhesion among the particles. Consequently, when the product mixture cures or drys and the foam dissipates, a stronger, low density product is produced as the particles remain spread from each other but in an interconnecting relationship due to the reacted dry binder, together with the liquid binder.

Preferably, the dry binder is less than about 50% by weight of the total weight of the liquid and dry binders. Preferably also, the reacted dry binder in the product mixture is located inwardly relative to, or in comparison with, the liquid binder. That is, a majority of the reacted dry binder is disposed inwardly of outer portions or surfaces of the product mixture, while the liquid binder has portions that are part of the outer surfaces of the product mixture when it is prepared for an outer layer to be joined to the product mixture. In that regard, the layered structure has at least a first outer member that is laminated or otherwise joined to outer surface portions of the product mixture. This joining together preferably is conducted before the product mixture of liquid and reacted dry binders, together with the particles, completely drys or cures, although the outer member could be joined to the product mixture after such drying and the dissipation of foam associated with the liquid binder. In one embodiment, the product mixture is sprayed or otherwise provided on an inner wall or surface of the first outer member. The product mixture can be provided in a form, size or shape appropriate for the outer member. For example, the product mixture can be uniformly or evenly displaced along the entire area of the inner surface or wall of the first outer member. A second outer member can then be placed over opposite portions of a second outer surface of the product mixture. The second outer member is preferably joined using at least some of the adhesive properties of the liquid binder of the product mixture that is found on this opposite outer surface of the product mixture.

It should be understood that the outer members can be formed from a variety of materials for a number of applications, with the usual common characteristic of such outer members being that each is relatively more rigid and has a greater density than the product mixture after it cures. The layered structure can be formed into a packaging product or material, such as the foldable parts of a cardboard box or package. It should be further understood that the product mixture can be used in other applications and with other types of materials joined thereto for such items or products as wall panels, panels generally, room dividers, doors, as well as various types of enclosure and/or support structures.

Based on the foregoing summary, a number of salient aspects of the present invention can be readily identified. A light, lower density layered structure is provided for a number of applications, such as boxes or other packaging materials, doors, portable or mobile enclosures, insulation constructions, dividers and panels. The present invention can utilize recyclable or environmentally advantageous materials as an intermediate layer between two relatively rigid pieces. The particles are made of a suitable material that, when formed into a desired shape, meet required weight or load bearing requirements but can also be re-cycled for producing the same or a similar product. The product mixture of the present invention can be readily adapted to strength requirements for a particular application by controlling the amount of particles and/or dry adhesive per unit volume. In that regard, the weight and density of the resulting layered structure can be regulated by using relatively fewer particles by weight, while still providing sufficient strength for the desired application. Furthermore, the reacted dry binder is located relatively inwardly of the product mixture to provide desired product strength. When utilized, the liquid foamed binder, on the other hand, is located outwardly thereof, such as the liquid binder being found on outer surface portions of the product mixture, to enhance adhesive properties to outer members joined thereto. Alternatively, a foamable substance, different from a liquid adhesive, might be used to provide the desired separation of particles.

Additional advantages of the present invention will become readily apparent from the following discussion, particularly when taken together with the accompanying drawings.

BRIEF DESCRIPTION OF THE DRAWINGS

FIG. 1 is a block diagram of a system for producing a layered structure;

FIG. 2 is a block diagram illustrating an embodiment for providing a product mixture of particles, liquid binder and reacted dry binder.

DETAILED DESCRIPTION

Figure 3:
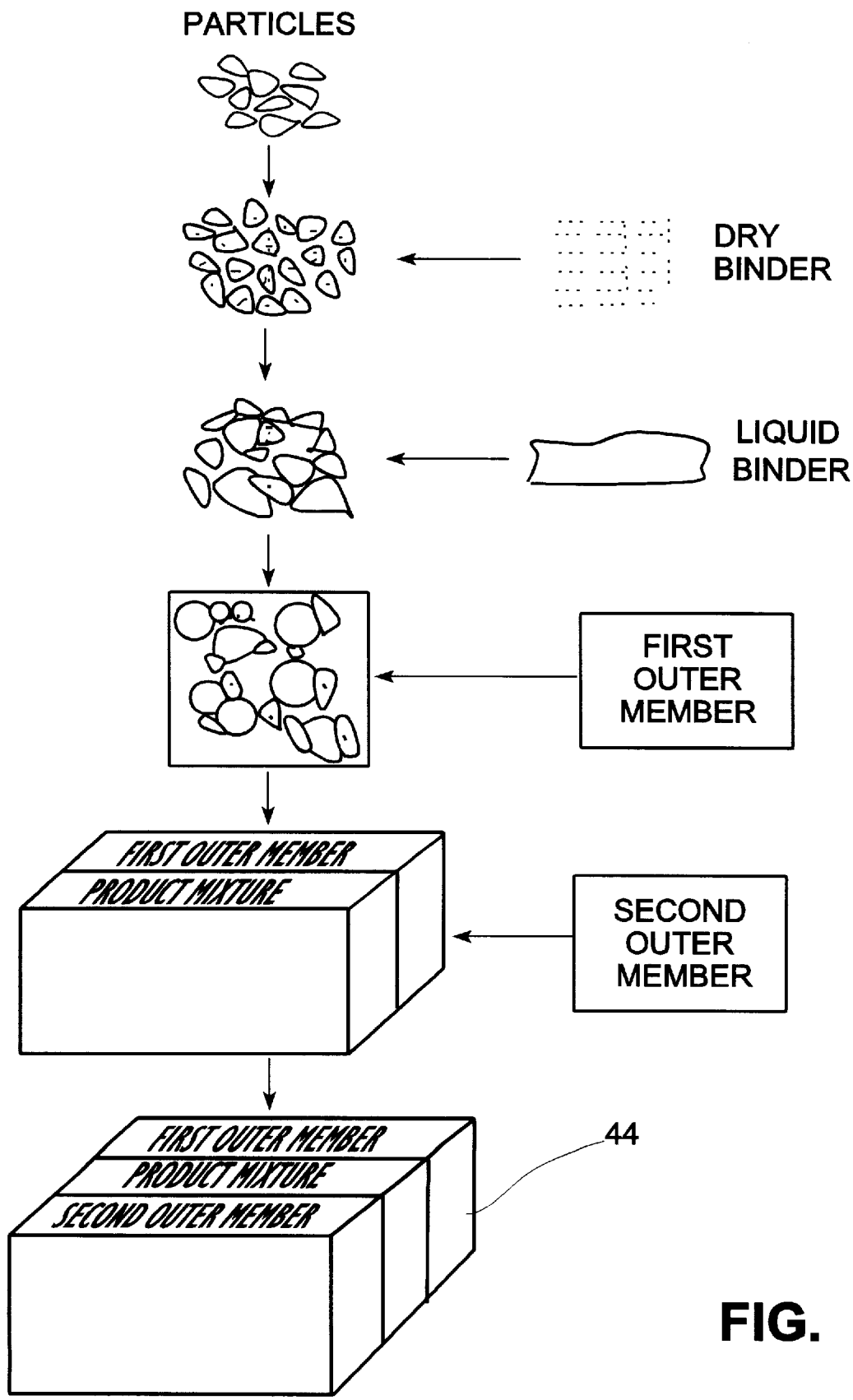
FIG. 3 schematically illustrates steps related to producing a layered structured of the present invention.

The layered structure of the present invention can be made in different ways using a variety of hardware implementations, particularly depending on the application (s) of the resulting layered structure.

With reference to FIGS. 1 and 2, one embodiment is illustrated using block diagrams for producing a layered structure that includes a product mixture and one or more panels or outer members joined to the product mixture. In particular, a combining apparatus 10 is provided that combines the materials or compositions of the product mixture. The product mixture can be defined as including a number of particles, a foamable liquid binder material or adhesive and a reacted binder material or adhesive, although other foamable substances might be utilized instead of liquid binder, such as those comprised substantially of water. The reacted binder is initially in a dry, solid state, in comparison with the liquid binder. The reacted binder becomes flowable or viscous when contacted by or mixed with the liquid binder. Such combining of the liquid and dry binders causes the desired reaction between the liquid binder and the resulting reacted binder.

The numerous particles that are part of the product mixture are preferably fibrous particles that can be formed of a cellulosic material, such as common paper or paper board. Inorganic materials, not just such organic materials, can also be used as the particles of the product mixture. Such particles can include the same particles as identified in U.S. Pat. No. 4,768,710 to Sperber, who is also the inventor of the subject matter herein. Likewise, the liquid binder contemplated for use as part of the product mixture can include a number of adhesive materials, as noted in the Sperber '710 patent. Importantly, as described in the Sperber '710 patent, the liquid binder must be foamable to provide a foamed adhesive. Such a foamed adhesive is characterized by air pockets or bubbles that are present as part thereof. As explained and/or understood from the '710 Sperber patent, such a foamed adhesive can be obtained using a foaming agent, which is part of the liquid binder. Delivery of the liquid binder, in connection with making the product mixture, can also contribute to the foaming, such as by interaction between the liquid binder and pressurized air. Agitating or foam producing mechanisms can also be employed to assist in the production of the required foamed binder.

The composition of the dry adhesive is chosen to provide a necessary or desired strength of adhesion among the numerous particles, particularly after the product mixture has completely dried or cured. Such initially dry binder has relatively greater adhesive properties in comparison with the adhesive properties of the liquid binder. Additionally, the initially dry binder is less in amount by weight than the liquid binder, with the amount being dependent on the particular use or application. For those applications when greater adhesion and strength are required, relatively more dry binder is utilized. Regardless, it is anticipated that the reacted binder in its dry state will be less than 25% of the weight of the liquid binder. To achieve the desired adhesive properties, the dry binder can include conventional cement and/or plaster.

In one embodiment of the combining apparatus 10, a particles and dry binder combining apparatus 20 is utilized. The particles and dry binder combining apparatus 20 receives particles and it also receives the binder, that it is to react with the liquid binder, in its dry state. For example, the particles may be loaded into or otherwise input to a hopper of the particles and dry binder combining apparatus 20 and the dry binder may be placed or input into a bin of the same apparatus 20. The particles and dry binder combining apparatus 20 functions or operates to mix or otherwise combine these two materials in accordance with a predetermined or suitable ratio. One embodiment of such an apparatus is described in U.S. Pat. No. 5,647,696 to Sperber. In another embodiment, the particles and dry binder are pre-mixed before being placed into equipment that will also receive the foamable substance.

The embodiment of the combining apparatus 10 of FIG. 2 also includes a transport assembly 24 that carries the combined or mixed particles and dry binder, preferably under the force of pressurized air. The interaction between the pressurized air and the particles with the dry binder creates a separation among the particles and a lofting thereof. The lofted particles with dry binder are received by a nozzle 30 or other output device. Also input to the nozzle 30 at another port thereof is the foamable liquid binder 34 that is carried by a separate hose or line 34 to this port of the nozzle 30. In one embodiment, the liquid binder can be in its foamed state when input to the nozzle 30. The foamed liquid binder is combined with the separated and lofted particles with dry binder and are mixed together using the nozzle 30. Such devices and operation thereof, particularly related to generation of foamed liquid binder and combining it with the lofted materials from the particles and dry binder combining apparatus 20 can be understood from the disclosures in U.S. Pat. No. 5,131,590 to Sperber. The resulting product mixture is output by the nozzle 30 or other output assembly for desired usage.

Returning to FIG. 1, the layered structure includes one or more outer members or panels 40 to which the product mixture is laminated or otherwise joined. In one embodiment, the product mixture is joined to one or more panels 40 while the product mixture is in a wet or flowable state and has not yet dried or been cured. In this state of the product mixture, the foam of the foamed binder has not completely dissipated or has not completely dried. A layered structure 44 results from the interconnection between the product mixture and the one or more panels 40. Such a layered structure may constitute packaging material, such as parts of a cardboard container or box. Other resulting constructions that can comprise the layered structure 44 might include, but are not limited to, building panels, room dividers, doors or other barriers, as well as various types of enclosures or product supports. With regard to the outer members or panels 40, they can be separately provided using conventional panel forming machinery 50 or machinery that has been particularly devised for use with the product mixture.

With reference to FIG. 3, one series of major steps is illustrated for producing a layered structure 44. Specifically, a number of particles, such as organic, fibrous, cellulosic particles, are formed or otherwise obtained. These particles are combined with the dry binder that will be subsequently reacted with the liquid binder. The combination of the particles and dry binder is sufficiently mixed such that the smaller-in-size dry binder pieces are provided or thoroughly mixed about all or a substantial majority of the fibrous particles. In this embodiment of a process for combining the materials of the product mixture, the liquid binder is then injected or otherwise input to the combination of the particles and currently dry binder. The liquid binder is foamable to create a number of air bubbles or air pockets that are typically greater in size than each of the particles and the even smaller dry binder pieces. When the dry binder and the foamed liquid binder come into contact, a reaction occurs in the sense that the dry binder absorbs or otherwise receives the foamed liquid binder and a viscous, flowable reacted binder is produced. The foamed liquid binder, the reacted binder from the dry binder and the particles are mixed together, with the separated and lofted particles maintaining their separation due to the foaming properties of the liquid binder. The foamed liquid binder acts to maintain the separation of the fibrous particles, while the reacted binder functions to create a sufficiently strong bond among such particles.

The resulting product mixture can then be combined with a first outer member to create a layered structure with the one outer member joined thereto. Because the product mixture, in accordance with this embodiment, is still in its flowable state, it can be moved or positioned as desired relative to the inner wall or surface of the first outer member such that the first outer surface portions of the product mixture are properly joined to this inner surface of the first outer member. Because of the foamed liquid binder, at least some of the outer surface portions of the product mixture include this liquid binder that can be used to adhere to the inner surface of the first outer member. As should be appreciated, other binding or bonding materials or mechanisms can be employed to provide a desired interconnection between the first outer member and this product mixture.

In addition to a first outer member, a second outer member can be joined or laminated to the product mixture on a side thereof opposite the side to which the first outer member is joined. As with the first outer member, the second outer member can be applied and joined to the product mixture while it is still in its foamable state and has not entirely dried or been cured. After the second outer member is properly positioned and sufficiently joined to the product mixture and thereby also to the first outer member, an embodiment of the layered structure 44 is completed. Although the process description was directed to separate joining of first and second outer members to the product mixture, it should be understood that such additional layers could be combined with the product mixture at substantially the same time. With regard to the finished layered structure, more of the reacted binder is located inwardly of liquid binder. This arrangement results in appropriate adhesion among the particles of the product mixture and desired bonding therebetween, while the liquid binder can be useful in contributing to the interconnection of the product mixture with the first and second outer members.

The first and second outer members are preferably formed to provide relatively greater rigidity than the cured product mixture. In one embodiment, such first and second outer members define the outer panels or layers of a packaged container, such as a cardboard box. Even greater rigid outer members can be utilized, such as panels formed to be used as part of building structures, room dividers, doors or other barriers and/or enclosure or support units.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention as such, or in other embodiments, and with the various modifications required by their particular applications or uses of the invention. It is intended that the appended claims be construed to include alternative embodiments to the extent permitted by the prior art.

What is claimed is:

1. A method for making a layered structure, comprising:

providing a number of particles, a dry binder and a foamable substance, said dry binder weighing less than 50% of the weight of said foamable substance;

combining said particles, and said dry binder;

spreading said particles and said dry binder using pressurized air;

adding said foamable substance after said spreading step to form a product mixture;

joining a first outer member to a first portion of said product mixture while said product mixture is in a flowable state; and joining a second outer member to a second portion of said product mixture while said product mixture is in a flowable state to define a layered structure comprised of said product mixture and said first and second outer members.

2. A method, as claimed in claim 1, wherein:

said foamable substance includes a liquid binder.

3. A method, as claimed in claim 1, wherein:

said particles include fibrous particles.

4. A method, as claimed in claim 1, wherein:

said foamable substance creates air pockets to provide spaces between at least some of said particles.

5. A method, as claimed in claim 1, wherein:
said first outer member has a greater rigidity than said product mixture.

6. A method, as claimed in claim 1, wherein:
said dry binder weight is less than 25% of said weight of said foamable substance.

7. A method, as claimed in claim 2, wherein:
said adding step includes reacting between said dry binder and said liquid binder to produce a reacted binder and wherein a majority of said reacted binder is disposed inwardly of said product mixture relative to said liquid binder.

8. A method, as claimed in claim 7, wherein:
after said liquid binder dries, said liquid binder is more adjacent to an outer surface of said product mixture than is said reacted binder.

9. A method, as claimed in claim 2, wherein:
said adding step includes reacting between said dry binder and said liquid binder to produce a reacted binder and in which said reacted binder has greater adhesive properties than said liquid binder.

10. A method, as claimed in claim 2, wherein:
said liquid binder is caused to foam and each of said joining steps is conducted before said foam dries.

11. A method, as claimed in claim 1, further including:
forming a packaging construction using at least said layered structure.

12. A method, as claimed in claim 1, wherein:
said dry binder is selected from a group that includes cement and plaster.

13. A method, as claimed in claim 1, wherein:
a reacted binder is produced by said foamable substance and said dry binder and in which said foamable substance includes a liquid binder and a majority of said liquid binder is located closer to an outer surface of said product mixture than is said reacted binder at least during some time while said product mixture is in said flowable state.

14. A layered structure, comprising:
a product mixture having at least a first outer surface and including:
 a reacted binder that is initially in a dry state;
 a foamable substance that includes an adhesive which foams to define air pockets and in which said foamable substance is combined with said reacted binder in said dry state, said reacted binder having treater binding properties than said adhesive and said reacted binder in said dry state being less than about 50% by weight of said foamable substance and a majority of said reacted binder being located inwardly of said adhesive; and
 a number of particles; and
at least a first outer member joined to said first outer surface of said product mixtures, wherein said product mixture cures in which foam associated with said foamable substance dissipates.

15. A layered structure, as claimed in claim 14, wherein:
said reacted binder in said dry state is less than about 25% by weight of said foamable substance.

16. A layered structure, as claimed in claim 14, wherein:
said particles include fibrous, cellulosic materials and said reacted adhesive is defined by a group of materials that include cement and plaster.

17. A method, as claimed in claim 1, further including:
dissipating foam of said foamable substance as part of curing said foamable substance in order to provide a dried product mixture.

18. A layered structure, as claimed in claim 14, further including:
a second outer member joined to an outer surface of said product mixture that is different from said first outer surface.

19. A layered structure, as claimed in claim 14, wherein:
said adhesive is a foamable liquid adhesive.

* * * * *